United States Patent [19]

Kleijne et al.

[11] Patent Number: 4,811,288

[45] Date of Patent: * Mar. 7, 1989

[54] DATA SECURITY DEVICE FOR PROTECTING STORED DATA

[75] Inventors: Theodoor A. Kleijne, Dreumel; Johannes A. J. de Bruin, Montfoort; Jan B. Goossens, De Bilt, all of Netherlands

[73] Assignee: NCR Corporation, Dayton, Ohio

[*] Notice: The portion of the term of this patent subsequent to Jun. 3, 2003 has been disclaimed.

[21] Appl. No.: 877,907

[22] Filed: Jun. 24, 1986

[30] Foreign Application Priority Data

Sep. 25, 1985 [GB] United Kingdom ............... 8523622

[51] Int. Cl.$^4$ .................. G11C 5/00; G11C 5/02; G08B 21/00; G05B 9/02
[52] U.S. Cl. ...................... 365/52; 364/184; 340/652; 380/4; 365/228
[58] Field of Search ............ 365/52, 228; 340/652; 364/184; 380/4

[56] References Cited

U.S. PATENT DOCUMENTS

| | | | |
|---|---|---|---|
| 3,882,323 | 5/1975 | Smolker | 307/202.1 |
| 4,494,114 | 1/1985 | Kaish | 364/900 |
| 4,502,130 | 2/1985 | Kuckuk | 365/52 |
| 4,593,384 | 6/1986 | Kleijne | 365/228 |
| 4,691,350 | 9/1987 | Kleijne et al. | 380/3 |

FOREIGN PATENT DOCUMENTS 0142013 6/1984 European Pat. Off. .
0128672 12/1984 European Pat. Off. .
3023427 6/1980 Fed. Rep. of Germany .

Primary Examiner—Terrell W. Fears
Assistant Examiner—Melissa J. Koval
Attorney, Agent, or Firm—Wilbert Hawk, Jr.; Albert L. Sessler, Jr.; Richard W. Lavin

[57] ABSTRACT

A security device (10) for protecting sensitive data stored in a resettable memory (110) includes a housing (11) formed of six ceramic plates (P1-P6) each having provided thereon a pair of thin film conductive path segments arranged in a meandering configuration. The thin film conductive path segments are joined together by interconnection devices (30) each including a pair of ceramic studs (e.g. K9, K10) having conductive areas (34, 38) thereon connected by an interconnect block (e.g. N5), thereby forming two complete thin film conductive paths (WMA, WMB) which meander in a closely spaced, parallel manner over the entire inner surface of the housing (11). Interrupting or short circuiting the thin film conductive paths (WMA, WMB) causes reset means (130) to reset the resettable memory (110) thereby erasing the data stored therein.

11 Claims, 8 Drawing Sheets

DATA SECURITY DEVICE FOR PROTECTING STORED DATA

BACKGROUND OF THE INVENTION

1. Field of Invention

This invention relates to a security device and more particularly to a housing constructed to prevent external access to sensitive data stored therein.

2. Description of the Prior Art

Several known prior art techniques have been proposed for the construction of a housing which prevents access to the sensitive data stored therein.

International Patent Application No. 84/04614 discloses a data security device which includes a container formed of a brittle material such as prestressed glass and which includes a data processor, a volatile CMOS RAM memory device for storing encryption key data, and a battery forming the power supply for the memory device. The container consists of a housing and a lid. The battery is connected to the memory device by a power supply conductor formed in a winding path configuration on the interior surfaces of the housing and the lid, the parts of the power supply conductor on the housing and lid being connected by pairs of contacts at the joint faces between the housing and the lid. The conductor is formed by an evaporated metal thin film material. The power supply conductor pattern is bifilar and the parts of the conductor are interleaved with additional conductors on the interior surfaces of the housing and lid which are earthed or connected to a voltage source. Thus, if the power supply conductor is interrupted or connected to either of the additional conductors the power supply to the volatile RAM would be so much altered that the data in the RAM would be destroyed. The known device has the disadvantage of a relatively low level of security since the width of the power supply conductor provided on the housing must be maintained sufficiently great to enable the provision of an adequate power supply to the memory device. Such relatively wide conductors are subject to the possibility of penetration. For example, it could be possible to produce a hole of sufficiently small diameter to maintain a conductive path in a relatively wide power supply conductor, yet enable unauthorized access to the memory device via the hole.

German Offenlegungsschrift No. 3,023,427 discloses a mobile data storage unit which includes a plurality of memory devices within a closed container formed by a housing and a lid. Located within the material forming the walls of the container are a plurality of differential pressure sensing devices connected to closed channels also located in the walls of the container, such that any attempt to break into the container which disrupts the pressure in the closed channels is detected by the pressure sensing devices and causes the operating of a relay to provide an erase signal to erase the contents of the memory devices. Also located within the material forming the walls of the container are a pair of thin conductors, which run in an arbitrary configuration through the housing and the lid, and are connected to a power source and the relay. Any external influence which breaks either of these thin conductors also causes the relay to provide an erase signal to erase the contents of the memory devices. However, this known device is of complex and expensive construction resulting from the provision of the closed channels and pressure sensing devices. Furthermore, the possibility exists of forming a small diameter hole into the interior of the unit without interrupting either of the pair of thin conductors. Thus, the degree of security achievable with this known unit is also limited.

It is thus an object of the present invention to provide a data security device wherein the aforementioned disadvantages are alleviated.

SUMMARY OF THE INVENTION

This and other objects of the invention are fulfilled by providing a security device for protecting stored sensitive data, including a closed housing containing memory means adapted to store sensitive data, and conductive path means provided in a winding configuration on the entire inner surface of said housing, wherein said housing contains tamper detection circuitry which is coupled to said conductive path means and to said memory means, and which includes reset signal generating means adapted to generate a reset signal to erase the contents of said memory means in the event of an interruption of said conductive path means brought about by an attempt to penetrate said housing. The conductive path means includes first and second substantially parallel conductive paths provided on the inner surface of the housing whereby upon the interruption of either of the first and second conductive paths, a reset signal is produced to erase the contents of the memory means.

BRIEF DESCRIPTION OF THE DRAWINGS

The foregoing and various other objects, advantages and meritorious features of the present invention will be apparent from the following detailed description and appended claims when read in conjunction with the drawings, wherein like numerals identify elements.

FIG. 11 is a circuit block diagram of the tamper detection circuitry of FIG. 9.

DESCRIPTION OF THE PREFERRED EMBODIMENT

Figure 1:
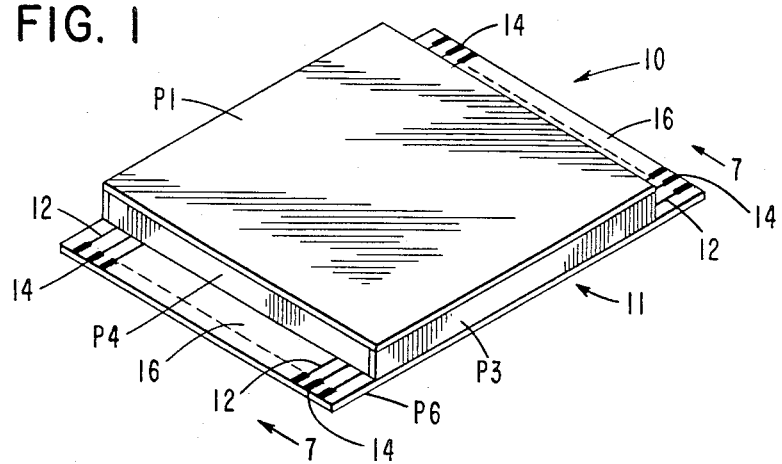
FIG. 1 is a perspective view of a security device according the invention.
Figure 2:
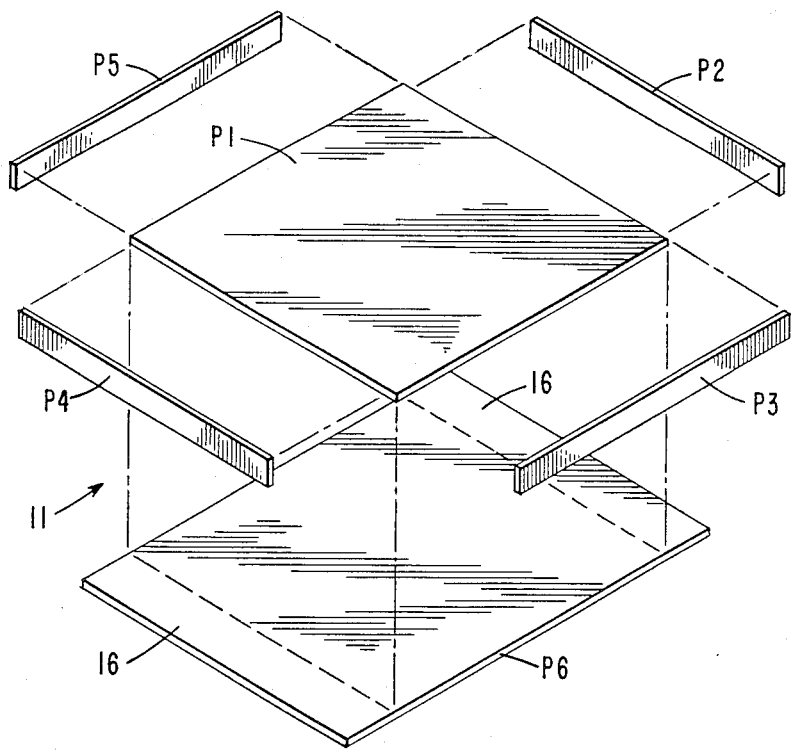
FIG. 2 an exploded perspective view of the security device in FIG. 1.

Referring first to FIGS. 1 and 2 of the drawings, a security device 10 according to the invention is shown which includes a housing 11 which is formed by a top plate P1, side plates P2-P5 and a base plate P6. The six plates P1-P6 are preferably formed of a ceramic material since ceramic material is highly resistant to chemical attack. Included within the security device 10 is electronic circuitry (not shown in FIGS. 1 and 2), connected via conductive paths 12 to terminal areas 14 provided on end portions 16 of the base plate P6. The terminal areas 14 are in contact with respective conductive input-output pins (not shown) in a conventional manner to enable connections to external circuitry to be made by mounting the security device 10 on a printed circuit board.

Referring to FIGS. 3-7 inclusive, the construction of the device 10 will now be described. Each of top plate P1, the side plates P2-P5 and the bottom plate P6 forming the housing 11, is provided on its interior surface with a pair of conductive path segments formed in a winding configuration with the paths on the various plates P1-P6 being connected together in a manner to be described hereinafter to form two complete conductive paths referred to herein as wire mesh A (WMA) and wire mesh B (WMB). Thus, referring to FIG. 3, the bottom plate P6 is provided with conductive path segments P6A and P6B; referring to FIG. 4, the top plate P1 is provided with conductive path segments P1A and P1B; and referring to FIG. 5, the side plate P3 is provided with conductive path segments P3A and P3B. The conductive path segments P6A, P1A and P3A form part of WMA, and the conductive path segments P6B, P1B and P3B form part of WMB. The conductive path segments on the side plates P2, P4 and P5 have an identical configuration to that shown for side plate P3 in FIG. 5, the side plates P2, P4 and P5 being provided with conductive path segments P2A, P2B; P4A, P4B; and P5A, P5B. The conductive path segments on all the side plates have identical configurations. It should be noted, however, that the side plates P2 and P4 have a slightly shorter length than the side plates P3 and P5, the end portions 20, 22 being absent. Thus, when the housing 11 of the device 10 is assembled the side plates P2 and P4 are attached to the end portions 20 and 22 of the side plates P3 and P5.

Figure 3:
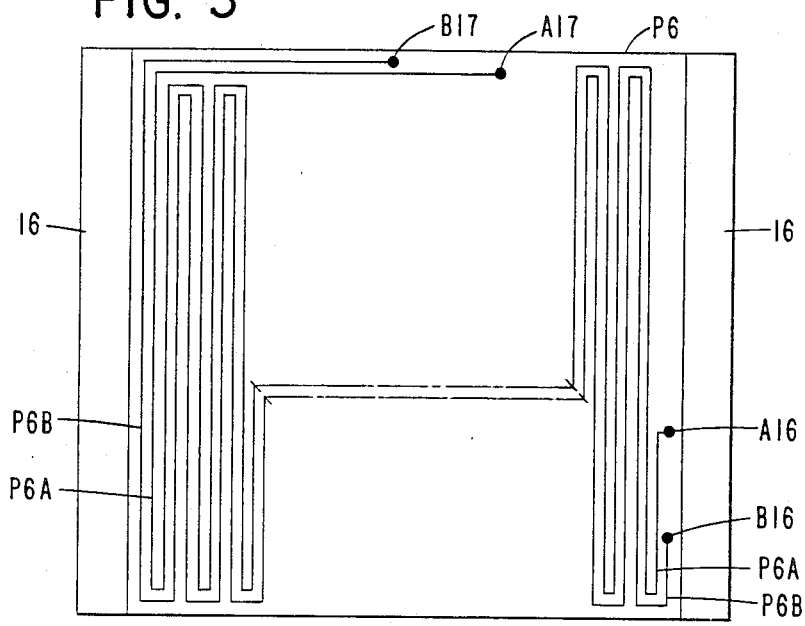
FIG. 3 schematic view showing on an enlarged scale two conductive path segments formed on the interior surface of the base plate of the security device shown in FIG. 1.
Figure 4:
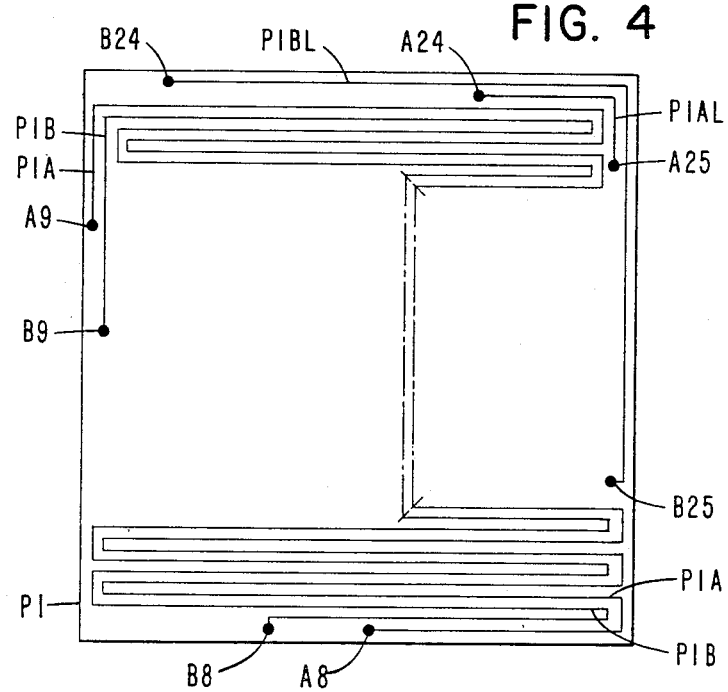
FIG. 4 is a schematic view showing on an enlarged scale two conductive path segments formed on the interior surface of the top plate of the security device shown in FIG. 1.
Figure 5:
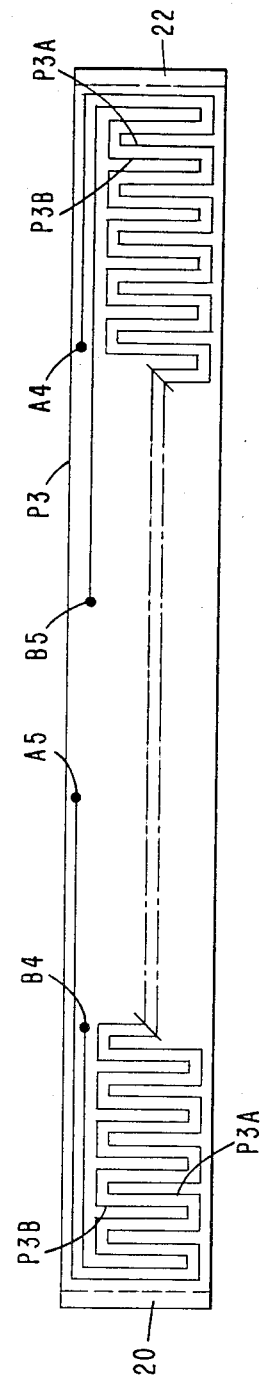
FIG. 5 is a schematic view showing on an enlarged scale two conductive path segments formed on the interior surface of one of the side plates of the security device shown in FIG. 1.

It will be appreciated that the precise configuration of the conductive path segments such as P1A, P1B, ... , P6A, P6B is not of importance, and for reasons of clarity, has been shown only schematically in FIGS. 3, 4 and 5. Suffice it to say that the path segments of the wire meshes WMA and WMB are disposed in an adjacent, coplanar, parallel relationship and form a winding configuration over substantially the entire surfaces of the respective plates P1-P6, with the exception of the end portions 16 of the base plate P6 and the end portions 20, 22 of the side plates P3 and P5. The winding configurations may be meandering paths which meander back and forth over the plate surfaces, as indicated in FIGS. 3, 4 and 5. the conductive path segments have a width of about 25 micrometers and the spacing between adjacent conductive segments is also about 25 micrometers. Furthermore, the thickness of the conductors of the conductive path segments is preferably within the range of about 0.5 micrometers to about 3.0 micrometers and in the preferred embodiment is about 1.0 micrometers. If desired, the conductive path segments P1A, P1B, ... , P6A, P6B could be coated with an insulating layer.

Figure 8:
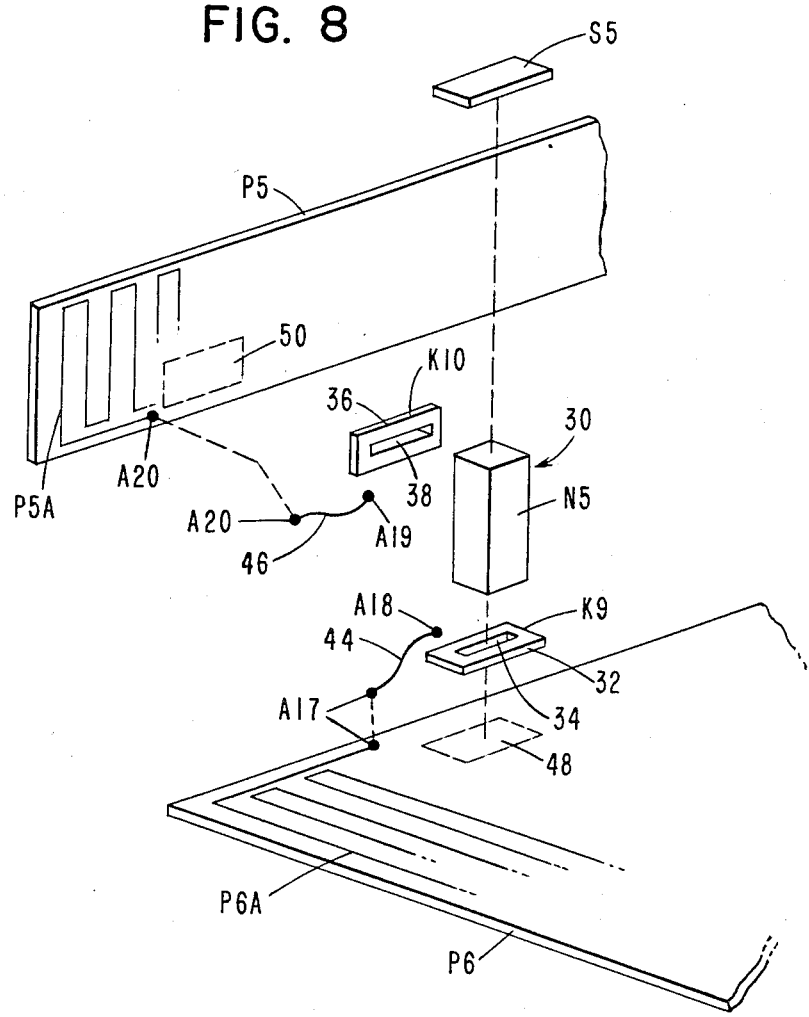
FIG. 8 is an exploded perspective view showing the construction of one of the interconnection devices.

The manner in which the conductive path segments on the respective plates are interconnected will now be described with reference to FIG. 8, which shows an exploded perspective view of a typical interconnection device 30 interconnecting the conductive path segments P5A and P6A on the plates P5 and P6 respectively. The interconnection device 30 includes interconnect studs K9 and K10, an interconnect block N5 and a support stud S5. The interconnect stud K9 includes a nonconductive ceramic body 32 provided with a conductive area 34. The interconnect stud K10 is of identical construction to the interconnect stud K9, and includes a nonconductive ceramic body 36 provided with a conductive area 38. The interconnect block N5 serves to provide an electrical interconnection between the conductive areas 34 and 38 on the interconnect studs K9 and K10 respectively. The interconnect block N5 may be formed of metal, but in the preferred embodiment includes a six sided block of nonconductive ceramic material, with two adjacent sides, that is, the sides facing the interconnect studs K9 and K10 having conductive coatings provided thereon, such that a conductive path is established between the conductive areas 34 and 38. This has the advantage that the thermal coefficient of expansion of the interconnect block N5 is compatible with the other ceramic components of the security device 10. The support stud S5 is of ceramic material and is located between the interconnect block N5 and the top plate P1 (not shown in FIG. 8) when the housing 11 of the security device 10 is assembled.

An interconnection point A17 is formed by bonding one end of a wire 44 to the conductive path segment P6A on the plate P6. The other end of the wire 44 forms an interconnection point A18 by bonding to the conductive area 34. An interconnection point A20 is formed by bonding one end of a wire 46 to the conductive path segment P5A on the plate P5. The other end of the wire 46 forms an interconnection point A19 by bonding to the conductive area 38.

The interconnection device 30 is assembled by bonding the interconnect studs K9, K10 to the respective plates P6, P5 by nonconductive epoxy, and bonding the interconnect block N5 to the conductive areas 34, 38 by conductive epoxy. The interconnect block N5 is also bonded to the support stud S5 by nonconductive epoxy. The interconnect studs K9 and K10 are bonded by nonconductive epoxy to areas 48 and 50 on the respective plates P6 and P5. Bonding materials other tan epoxy could be used. It should be understood that the areas 48 and 50 overlie regions of the meandering coplanar conductive path segments P6A, P5A, P6B, P5B, although the conductive path segments P6B, P5B are not shown in FIG. 8 for reasons of clarity. It will be appreciated that with this arrangement the interconnection device 30 provides a very high degree of security against unauthorized attempts to break into the housing 11 of the security device 10 in the neighborhood of an interconnection device such as the device 30.

Figure 6:
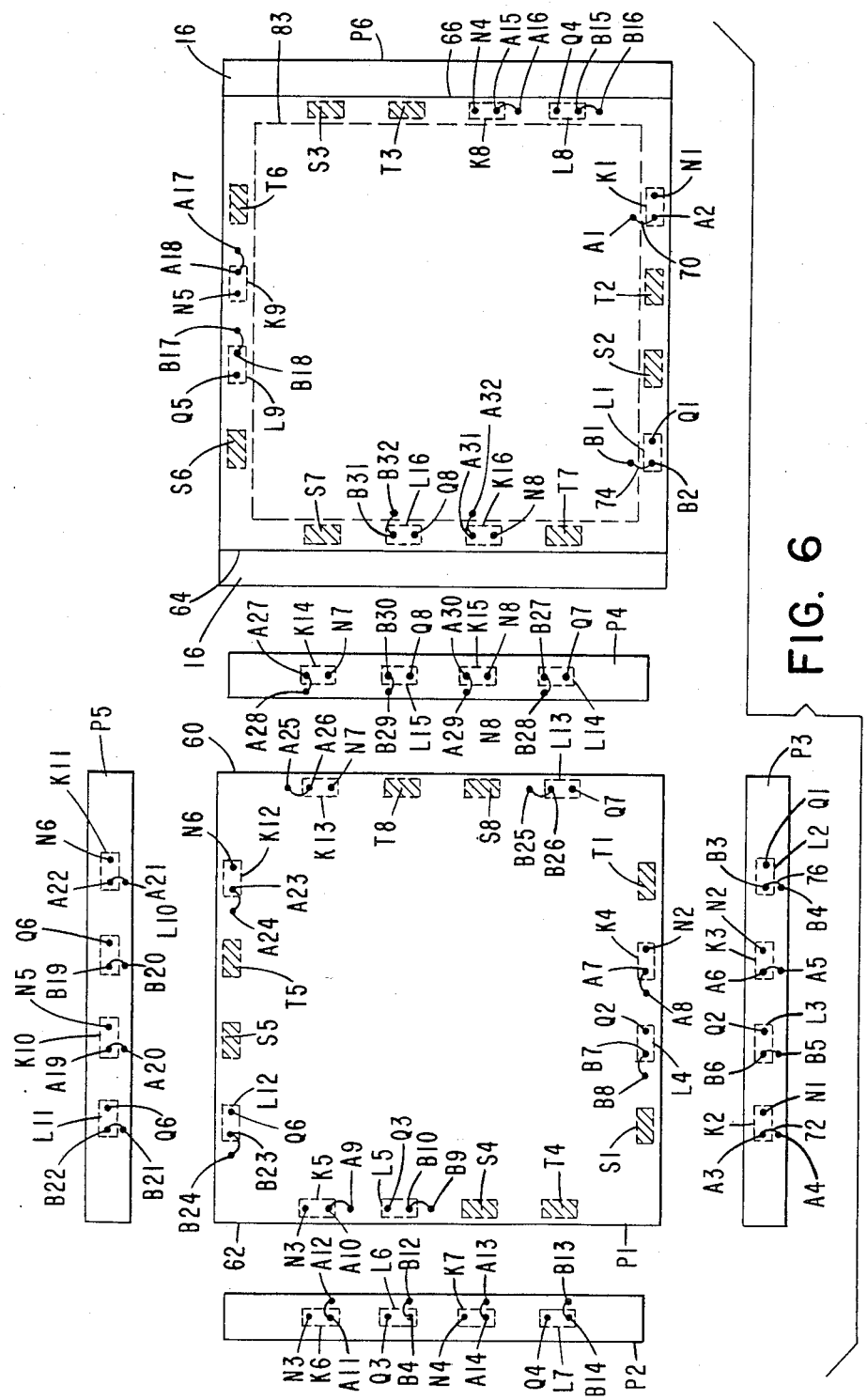
FIG. 6 is a schematic view showing the manner in which the interconnections between the conductive path segments on the respective interior surfaces of the six plates forming the housing of the security device shown in FIG. 1 are formed.

Referring now to FIG. 6, the interior surfaces of the six plates P1-P6 of the housing 11 are shown schematically. When assembled, the edges 60, 62 of the top plate will overlie the inner boundaries 64, 66, respectively, of the end portions 16 of the base plate P6. For clarity, the conductive path segments P1A-P6A and P1B-P6B are not shown in FIG. 6.

Figure 9:
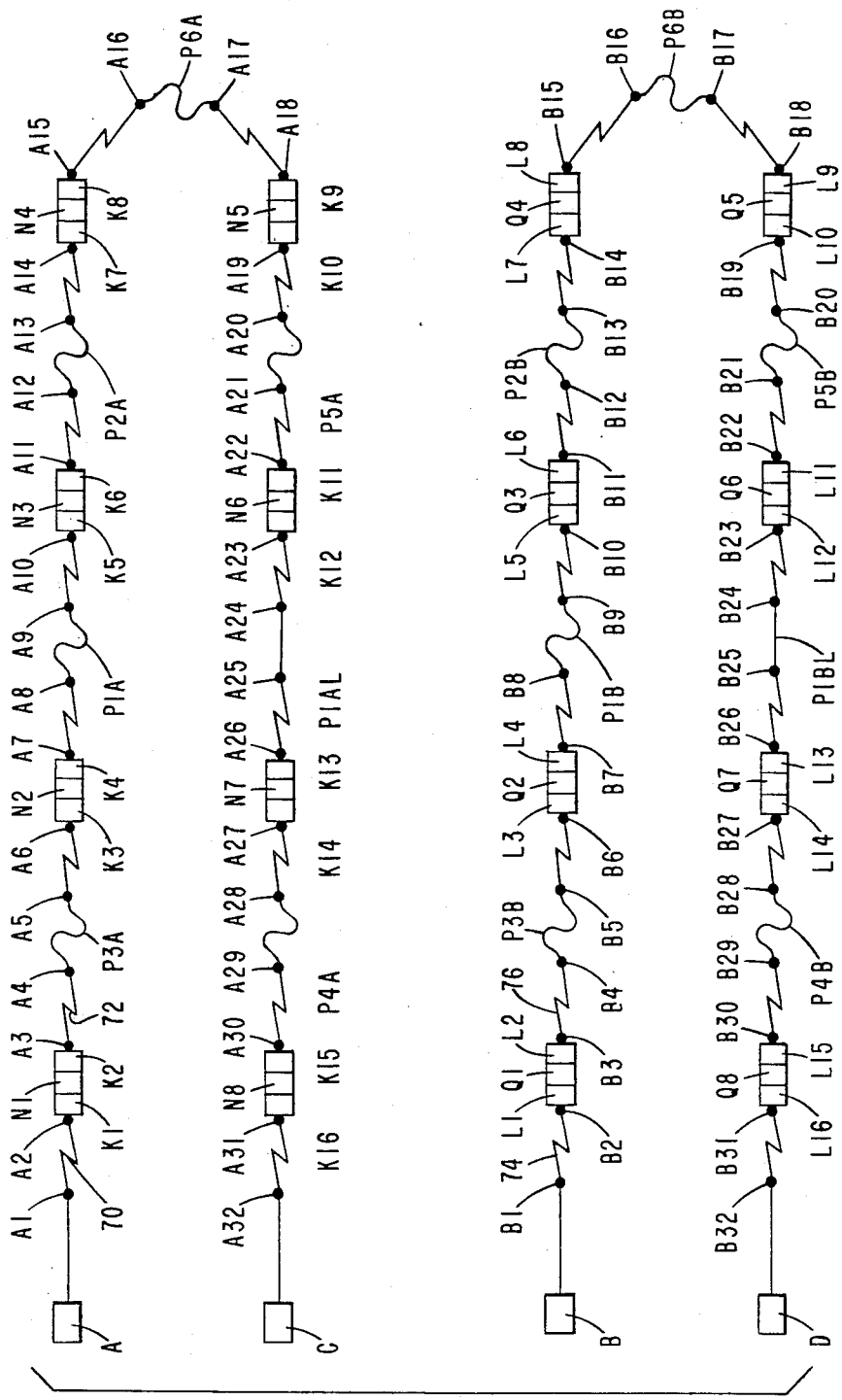
FIG. 9 shows the manner in which the conductive path segments on the interior surfaces of the six plates are interconnected to form two complete conductive paths.

The configuration of the wire meshes WMA and WMB as embodied on the six plates P1-P6 so as to form winding path configurations over the entire inner surface of the housing 11, will be clarified by referring to FIG. 6 in conjunction with FIG. 9, which shows the wire mesh WMA formed between terminals A and C and the wire mesh WMB formed between terminals B and D.

In more detail, the wire mesh WMA connects to interconnection point A1 (FIGS. 6 and 9), and thence via a conductive wire 70 to interconnection point A2 on the interconnect stud K1. The conductive wire 70 is bonded and connected in a similar manner to that described hereinabove for the wire 44 in FIG. 8. For the sake of clarity, the conductive areas on the interconnect studs such as K1, to which the interconnections are made, are not specifically shown in FIG. 6. The path proceeds from the interconnect stud K1 via the interconnect block N1 (schematically shown in FIG. 6 as a pair of dark spots on the interconnect studs K1 and K2 respectively), the interconnect stud K2, the interconnection point A3, a conductive bonded wire 72 and an interconnection point A4 which is connected to the conductive path segment P3A (not shown in FIG. 6) on the plate P3. The support stud S1 is shown schematically as a shaded area on the plate P1. In FIG. 9, the zigzag line configurations such as the zigzag line between interconnection points A5 and A6, represent conductive bonded wires similar to the conductive bonded wires 70 and 72. By following through the sequence shown for WMA in FIG. 9, it will be seen that the wire mesh WMA includes winding conductive path segments P3A, P1A, P2A, P6A and P5A on the plates P3, P1, P2, P6 and P5 in sequence, a conductive interconnect path P1AL between the interconnection points A24 and A25 (See FIG. 4) on the plate P1 and a winding conductive path segment P4A on the plate P4. The physical location of the interconnect studs K1-K16 and the interconnect blocks N1-N8 is clear from FIG. 6, which also shows the location of the support studs S1-S8 for the interconnect blocks N1-N8. The interconnect studs K1-K16 are all of identical construction to the interconnect studs K9 and K10 described hereinabove with reference to FIG. 8.

The configuration of the wire mesh WMB is identical to that just described for the wire mesh WMA. Thus, the path from terminal B connects to interconnection point B1 (FIGS. 6 and 9), and thence via a conductive wire 74 bonded to interconnection point B2 on an interconnect stud L1. The path proceeds from the interconnect stud L1 via an interconnect block Q1 (schematically shown as a pair of dark spots on the interconnect studs L1 and L2 respectively), the interconnect stud L2, the interconnection point B3, a conductive wire 76 and an interconnection point B4 which is connected to the conductive path segment P3B (not shown in FIG. 6). The support stud T1 is shown schematically as a shaded area on the plate P1. By following through the sequence shown for WMB in FIG. 9, it will be seen that the wire mesh WMB includes winding conductive path segments P3B, P1B, P2B, P6B and P5B on the plates P3, P1, P2, P6 and P5 in sequence, a conductive interconnect path P1BL between the interconnection points B24 and B25 on the plate P1 (see FIG. 4) and a winding conductive path segment P4B on the plate P4. The physical location of the interconnect studs L1-L16 and the interconnect blocks Q1-Q8 is clear from FIG. 6, which also shows the location of the support studs T1-T8 for the interconnect blocks Q1-Q8.

Figure 7:
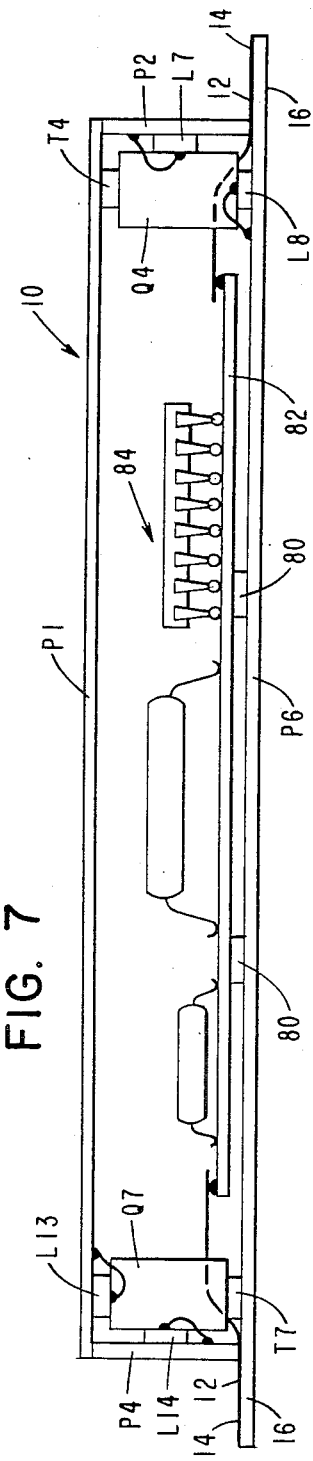
FIG. 7 is an end view on an enlarged scale of the interior of the security device shown in FIG. 1 looking along the direction of the arrows 7—7 in FIG. 1, with the front side plate removed.

Referring now to FIG. 7, an end view of the interior of the assembled security device 10 is shown. Mounted on the base plate P6 are ceramic studs 80 which support a ceramic plate 82 on which is mounted electronic circuitry shown generally by reference 84. The location of the ceramic plate 82 is shown by the dashed rectangle 83 in FIG. 6. The electronic circuitry 84, FIG. 7, is connected via conventional flexible printed circuit connections 86 to the conductive paths 12 and hence to the terminal area 14. Also shown in FIG. 7 are interconnect blocks Q4 and Q7, interconnect studs L7, L8, L13 and L14 mounted on the plates P2, P6, P1 and P4 respectively, and support studs T4 and T7 mounted on the plates P1 and P6 respectively. It will be appreciated that the terminals A, C, B, D (FIG. 9) are included in the electronic circuitry 84, although not specifically shown in FIG. 7.

The manner in which the security device 10 is manufactured will now be briefly described. The plates P1-P6 are prepared in the following manner, utilizing known techniques of thin film technology. Firstly, a conductive thin film is deposited on a major surface of each of the ceramic plates P1-P6. In the preferred embodiment, a thin layer of nickel is initially deposited, followed by an overlying thin layer of gold. The deposition of such thin layers is standard in the art and can be implemented for example by dropping molten metal on to a substrate rotating at a high speed. However, other standard thin film deposition techniques could be utilized. The thickness of the thin conductive film should lie in the range of about 0.5 micrometer to about 3.0 micrometers and is preferably about 1.0 micrometer.

Next, the deposited thin conductive films are etched by conventional wet or dry etching techniques to form the desired conductive patterns, including the meandering conductive path segments P1A-P6A, P1B-P6B. Preferably, the width of the conductive path segments is about 25 micrometers and the spacing between adjacent conductive path segments of the wire meshes WMA and WMB is also about 25 micrometers, although conductive path width and spacing as small as about 10 micrometers would be possible. The plates are now trimmed to the correct size. The ceramic interconnect studs K1-K16 and L1-L16, the ceramic support studs S1-S8, T1-T8 and the interconnect blocks N1-N8, A1-A8 are produced. Conductive areas such as 34, 38 (FIG. 8) on the interconnect studs K1-K8, L1-L8 and conductive coatings on a pair of adjacent sides on each of the interconnect blocks N1-N8, Q1-Q8 are then formed by standard thick film deposition techniques. The ceramic interconnect studs K1-K16, L1-L16 and the support studs S1-S8, T1-T8 are then bonded to the plates P1-P6 at the desired locations by using nonconductive epoxy. Next, the interconnect studs K1-K16, L1-L16 are connected to the relevant interconnection points on the plates P1-P6 by bonding into place conductive wires, such as the wires 44, 46 shown in FIG. 8. The ceramic plate 82 (FIG. 7) having the electronic circuitry 84 mounted thereon is then mounted on the base plate P6 by means of the ceramic support studs 80. The side plates P2-P5 are then attached to the top plate P1, using nonconductive epoxy, with the interconnect blocks N1-N8, Q1-Q8 being attached in their desired locations on the top and side plates P1-P5. The assembly consisting of the plates P1-P5 is then bonded to the base plate P6 to form the complete device 10.

It will be appreciated that since the conductive path segments of the wire meshes WMA and WMB are coplanar on each of the respective plates P1-P6, they can be readily simultaneously formed by the simple thin film deposition and etching steps referred to above.

Figure 10:
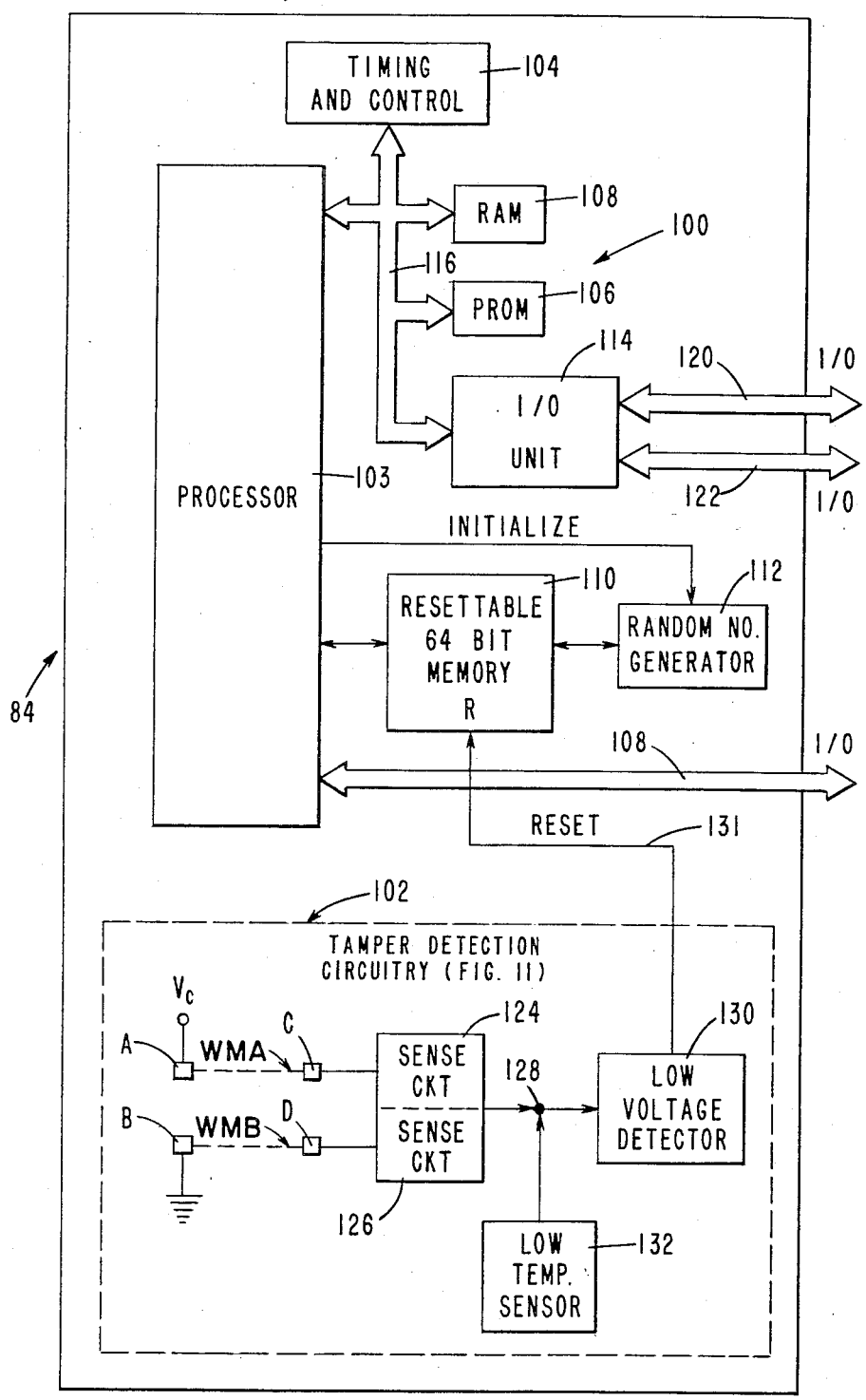
FIG. 10 is a block diagram of the electronic circuitry within the, security device shown in FIG. 1.

Referring now to FIG. 10, the electronic circuitry 84 of FIG. 7 will now be discussed in more detail. The electronic circuitry 84 includes data processing circuitry 100 and tamper detection circuitry 102.

The data processing circuitry 100 can be utilized to perform any desired data processing operation in such applications as, for example, electronic payment systems, electronic fund transfers, data encryption/decryption, PIN (personal identification number) verification, data transmission/reception, access control and home banking. The data processing circuitry 100 includes a processor 103 for selectively controlling the operating of the electronic circuitry 84 in response to input data and instructions, a timing and control circuit 104 for controlling the operation of the processor 103, a programmable read only memory (PROM) 106 for storing the software program to be executed by the processor 103, a random access memory (RAM) 108 for providing a temporary memory storage, a volatile memory 110 for permanently storing the most sensitive or secure data such as a key storage key (KSK) (to be explained), a random number generator 112 and an input/output (I/O) unit 114.

A data, control and address bus 116, bidirectional I/O bus 118 and I/O lines 120 and 122 are coupled to the processor 103, timing and control circuit 104, PROM 106 RAM 108 and I/O unit 114 to enable the data processing circuitry 100 to perform its data processing operations. Data may be passed over bidirectional I/O bus 118 to or from the processor 103 and over I/O lines 120 and 122 to or from the I/O unit 114. The remote ends of the I/O bus 118 and the I/O lines 120 and 122 may be selectively coupled to, for example, another data processor (not shown), a main computer (not shown) and a peripheral (such as a keyboard) (not shown) via the terminals 14 (FIG. 1) in order to enable the data processing circuitry 100 to perform its preselected operations.

Power to operate the electronic circuitry 84 is preferably supplied from external power sources (not shown), such as power supplies and batteries, connected to preselected ones of the terminal areas 14 (FIG. 1).

An initialization subroutine, contained in the software program stored in the PROM 106, is executed in a special mode of operation controlled by an authorized person. Preferably, this initialization subroutine can only be executed once after the security device 10 (FIG. 1) has been completely assembled.

For purposes of additional security it is preferable that the volatile memory 110 be, for example, a resettable memory such as a 64-bit shift register memory.

During the execution of an INITIALIZE subroutine the processor 103 applies an INITIALIZE signal to the random number generator 112 to enable the generator 112 to generate a random number which is stored in the memory 110 as an exemplary sequence of 64 random bits. This sequence of 64 random bits is the KSK (key storage key), which is the most sensitive or secure data contained in the data processing circuitry 100. The KSK is utilized to encrypt keys which are to be entered into the security device 10 for storage in the RAM 108.

Such keys are then used in data encryption operations. The precise manner in which the KSK is utilized is not of significance to the present invention and will, therefore, not be further described herein. It should, however, be noted that the resettable memory 110 stores the KSK, that the contents of the memory 110 cannot be altered (if the security device 10 was programmed to run the initialization program only once), that the KSK is never outputted to the outside world from the security device 10, and that for purposes of security external access to the KSK contents of the memory 110 by various means must be prevented.

Tamper detection circuitry 102 is included in the electronic circuitry 84 to specifically actively destroy the KSK in the resettable memory 110 if there is any attempt to penetrate the housing 11 of the security device 10 to gain access to the KSK stored in the memory 79. It should be realized that if the KSK is destroyed, any encrypted data or keys stored in RAM 108 become meaningless or useless. Two principal ways that someone could employ to attempt to gain access to the KSK stored in the resettable table memory 110, as well as the reaction of the tamper detection circuitry 102 to such attempts, are discussed below.

An attempt to penetrate the ceramic housing 11 of the security device 10 may be made by drilling into or cracking the housing 11. To protect against this possibility, wire mesh A (WMA) of FIG. 9 is connected between a supply voltage VC and a sense circuit 124, while wire mesh B (WMB) of FIG. 9 is connected between a reference potential such as ground and a sense circuit 126. It will be recalled that WMA and WMB are different conductive paths formed on the interior surfaces of the plates P1-P6 forming the housing 11. An attempt to drill into or crack the housing 11 that damages either or both of WMA and WMB will be readily sensed. If WMA is broken or shorted to either WMB or ground by such an attempt, sense circuit 124 will generate a low voltage signal at point 128. Similarly, if WMB is broken or shorted to either WMA or VC by such an attempt, the sense circuit will generate a low voltage signal at point 128. In response to a low voltage signal at point 128, a low voltage detector 130 generates a RESET signal on a line 131 to reset the memory 110 thereby actively clearing or destroying the KSK in the resettable memory 110.

Because of the narrow width and spacing of the conductive path segments on the plates P1-P6, the possibility is precluded of forming a very small diameter hole without breaking the continuity of at least one of the wire meshes WMA and WMB. The formation of such a small diameter hole could provide the possibility of a security breach, for example by permitting a very thin wire to be inserted into the device 10 to make electrical contact with the electronic circuitry 84.

It is known that it is possible to retain data in static CMOS cells of a memory in an unpowered state (no supply voltage or battery voltage present), if those cells are initially frozen below −90 degrees centigrade before power is removed from the memory 110. If this were done, it could be possible to subsequently forcibly break into the security device 10 and read out the "frozen" contents of the memory 110.

A low temperature sensor 132 is therefore provided in the tamper detection circuitry 102 to protect the security device 10 (FIG. 1) against the above-described tampering at extremely low temperatures. The sensor 132 is also connected to point 128. Sensor 132 is so implemented that when the temperature within the housing 11 (FIG. 1) falls to, for example, −25 degrees centigrade, the sensor 132 generates and applies a low voltage signal to point 128. This low voltage signal applied from sensor 132 to point 128 will also cause the low voltage detector 130 to generate a RESET signal on the line 131 to reset the memory 110 to actively clear or destroy the KSK in the memory 110.

Referring now to FIG. 11, the tamper detection circuitry 102 will be described in more detail. The tamper detection circuitry 102 essentially includes four parts. A first part includes wire mesh WMA and sense circuit 124. A second part includes wire mesh WMB and sense circuit 126. A third part includes the low temperature sensor 132. All of the first, second and third parts are connected to a common output at point 128 which, in turn, is connected to the fourth part which includes the low voltage detector 130. Consequently, if any of the first, second or third parts detects any attempt to gain access to the KSK in memory 110 (FIG. 10) a low output is developed at point 128. As mentioned before, such a low output at point 128 will cause the low voltage detector 130 to actively reset the memory 110 to destroy the KSK stored therein.

In the first part, pin C of WMA is coupled to sense circuit 124. A high or positive supply voltage $V_C$ is applied to pin A of WMA and to each of cascaded inverters 134 and 136 in sense circuit 124. For purposes of this discussion assume that $V_C = +4.5$ volts. A one megohm resistor 138 is connected between pin C of WMA and a low reference potential such as ground. Pin C is also connected to the input of inverter 134. The output of inverter 136 is applied through a 120 kilohm resistor 140 to point 128.

When WMA is undamaged (not broken or shorted to either ground or WMB), the input to inverter 134 is high, the output of inverter 134 is low and the output of inverter 136 is high.

In the second part, pin D of WMB is coupled to sense circuit 125 and pin B of WMB is connected to the low reference potential or ground. A one megohm resistor 142 is connected between pin D of WMB and $V_C$. The supply voltage $V_C$ is also applied to cascaded inverters 144, 146, and 148. Pin D is also connected to the input of inverter 144 which, in turn, has its output connected to the input of inverter 146. The output of inverter 146 is then connected to the input of inverter 148. The output of inverter 148 is applied through a 120 kilohm resistor 150 to point 128. A 30 kilohm resistor 152 is connected between point 128 and ground to develop a common output for the sense circuits 124 and 126, as well as to the low temperature sensor 132 (to be explained).

When WMB is undamaged (not broken or shorted to either $V_C$ or WMA), the input to inverter 144 is low, the output of inverter 146 is low and the output of inverter 148 is high.

The third part includes the low temperature sensor 132 (FIG. 10). The low temperature sensor 132 includes: a negative temperature coefficient (NTC) bridge circuit 154 which includes serially-connected resistors 156 and 158 coupled between $V_C$ and ground, and serially-connected resistors 160 and 162 respectively coupled between $V_C$ and ground; an operational amplifier 164 having its noninverting input (+) connected to the junction of resistors 160 and 162 and its inverting input (−) connected to the junction of resistors 160 and 162; an inverter 166 for inverting the output of the operational amplifier 164; and a diode 168 coupled between the output of inverter 166 and the point 128.

The resistors 160 and 162 may be 800 kilohm resistors, while the resistors 158 and 160 may be 68 kilohm resistors having negative temperature coefficients (NTC). With this implementation the bridge circuit 154 would be unbalanced until the temperature inside the housing 11 reaches approximately −25 degrees C. It can be readily seen that when the bridge circuit 154 is unbalanced, the operational amplifier 164 develops a low output which is inverted by inverter 166 to backbias the diode 168. Therefore, when the temperature inside the housing 11 (FIG. 1) is above −25 degrees centigrade, the low temperature sensor 132 is effectively disconnected by the backbiased diode 168 from the point 128.

The fourth part includes a low voltage detector 130 connected to point 128 for developing a RESET signal on the line 131 when the potential across resistor 152 is below a preselected threshold voltage of, for example, +1.15 volts when $V_C = +4.5$ volts, a capacitor 170 connected between point 128 and ground for retaining the input potential (voltage developed across resistor 152) to the detector 130 for a sufficient time to enable the detector 130 to generate a RESET signal when the potential across resistor 152 falls below +1.15 volts. The low voltage detector 130 may be a voltage comparator which develops a low output when the voltage across resistor 152 falls below an internal reference potential of +1.15 volts.

Various conditions will now be discussed:

(1) When no attempt has been made to freeze and/or penetrate the housing 11 to gain access to the KSK in the resettable memory 110 (FIG. 10) the temperature in the housing 11 (FIG. 1) will be high enough not to trigger the low temperature sensor 132 and both WMA and WMB will be undamaged. As a result, the outputs of inverters 136 and 148 will both be high. Therefore, the voltage developed across resistor 152 (approximately +1.5 volts) will be above the 1.15 volt threshold of the low voltage detector 130. Consequently, the low voltage detector 130 will not develop the RESET signal.

(2) When WMA is broken or shorted either to ground or WMB, pin C goes to a low potential, causing the input to inverter 134 to go low. This low input is inverted to a high signal by inverter 134. The high signal (+4.5 volts) from inverter 134 is inverted by inverter 136 to a low signal (0 volts). Assume that WMB is not broken at this time and therefore that inverter 148 develops a high output (+4.5 volts). As a result, a voltage divider including resistors 140, 150 and 152 will cause point 128 to fall to approximately +0.9 volts. Since +0.9 volts is below the +1.15 volt threshold of the low voltage detector 130, the low voltage detector 130 will develop the RESET signal to actively reset memory 110 (FIG. 10).

(3) When WMB is broken or shorted either to $V_C$ or WMA, pin D goes-high (+4.5 V). This high signal is inverted by inverter 144. The low signal (0 volts) from inverter 144 is inverted by inverter 146. The high signal from inverter 146 is inverted by inverter 148. Assume that WMA is not broken at this time and therefore that inverter 136 develops a high output (+4.5 volts). As a result, the voltage divider comprised of resistors 140, 150 and 152 will cause point 128 to fall to approximately +0.9 volts. This will then cause the low voltage detector 130 to develop the RESET signal to reset memory 110 (FIG. 10).

If both WMA and WMB are broken, the inverters 136 and 148 will both go low, causing the charge across capacitor 170 to fall toward 0 volts. However, as soon as the voltage across capacitor 170 falls below +1.15 volts, the low voltage detector 130 will generate the RESET signal on the line 131.

(4) If $V_C$ falls below +3.5 volts, the voltage across capacitor 170 will fall below +1.15 volts. This again will cause the low voltage detector 130 to generate the RESET signal on the line 131.

(5) When the temperature in the housing falls below −25 degrees centigrade, the bridge circuit 154 in the low temperature sensor 132 becomes either balanced or unbalanced in the opposite direction. In either event, the operational amplifier 164 develops a high output which is inverted by inverter 166. The low output (0 volts) from inverter 166 forward biases diode 168 causing point 128 to fall toward 0 volts. This will cause the charge across capacitor 170 to fall toward 0 volts. However, as soon as the voltage across capacitor 170 falls below +1.15 volts, the low voltage detector 130 generates the RESET signal on the line 131 to clear the memory 110.

It will be seen that the invention thus provides a security device 10 for the secure storage of sensitive data. It provides protection for the device 10 against chemical attack, physical attack, and tampering at extremely low temperature. The ceramic housing cannot be penetrated by chemicals, since ceramic material will not dissolve. Physical attack by cutting or drilling will result in the ceramic housing 11 cracking or breaking, thus breaking or damaging at least one of the two conductive paths WMA and WMB. Penetration of the housing 11 by forming a very small diameter hole will result in the interruption of at least one of the wire meshes WMA and WMB. Furthermore, attempts to utilize a conductive fluid to bypass interruptions of the wire meshes will result in a short circuit between the wire meshes WMA and WMB. The tamper detection circuitry 102 then actively resets the resettable memory 110 to destroy the sensitive data stored therein. Similarly, any attempt to tamper with the security device 10 at an extremely low temperature will also cause the tamper detection circuitry 102 to actively reset the memory 110.

Modifications of the invention are possible without departing from the true spirit and scope of the invention as defined in the appended claims. For example, if in a particular application it were envisaged that the use of a conductive fluid to bypass interruptions in the conductive path were not a practical possibility, then the two wire meshes WMA and WMB could be replaced by a single wire mesh forming a winding configuration over the entire interior surface of the housing 11, by interconnecting winding conductive path segments on the parts P1-P6 in the manner described hereinabove.

It will be appreciated that by forming the wire meshes WMA and WMB using thin film technology, the thin film conductive path segments forming the wire meshes WMA and WMB can have a very narrow width and spacing, thereby enhancing the security of the security devices. However, if a somewhat lower degree of security were deemed to be acceptable in a particular application, a modification would be possible wherein the conductive path segments constituting the wire meshes WMA and WMB could be formed by thick film technology. Using thick film technology, a preferred width and spacing for the conductive paths and spacing is about 300 micrometers, with a film thickness of about 10 micrometers.

What is claimed is:

1. A security device for protecting stored sensitive data comprising:
   a closed housing containing resettable memory means adapted to store sensitive data, said memory means erasing the sensitive data upon being reset;
   a plurality of conductive path means mounted in a winding configuration on the entire inner surface of said housing and formed by a conducting thin film, said conductive path means being spaced from one another by a distance of less than 26 micrometers thereby preventing the penetration of the housing without cracking the housing by the drilling of a small hole or the like in the housing which would not interrupt the conductive path means; and
   tamper detection circuitry connected to said conductive path means and to said memory means for generating a plurality of control signals in response to an interruption of said conductive path means, said detection circuitry including reset signal generating means adapted to generate a reset signal to reset said memory means in response to the generation of one of said control signals as a result of an interruption of said conductive path means brought about by an attempt to penetrate said housing by the drilling of said small hole.

2. A security device according to claim 1, wherein said plurality of conductive path means includes first and second substantially parallel conductive paths provided on said inner surface of said housing.

3. A structural device according to claim 2, wherein said housing includes a plurality of individual structural parts connected together forming the housing, each structural part including a ceramic substrate having first and second parallel conductive path segments provided thereon, said device including interconnection means interconnecting the respective first and second conductive path segments on said plurality of individual structural parts to form said first and second conductive paths.

4. A security device according to claim 3, wherein said conductive path segments are formed by a thin conductive film having a thickness in the range of from about 0.5 micrometers to about 3.0 micrometers.

5. A security device according to claim 4, wherein the width of said conductive path segments is in the range of from about 10 micrometers to about 25 micrometers and the spacing between adjacent conductive path segments is in the range of from about 10 micrometers to about 25 micrometers.

6. A security device according to claim 5, wherein interconnection means includes a plurality of individual interconnection devices, each including: first and second nonconductive members having respective first and second conductive areas provided thereon, said first and second nonconductive members being mounted on first and second ones of said parts; conductive means interconnecting said first and second conductive areas with respective conductive path segments on said first and second parts; and a conductive member interconnecting said first and second conductive areas.

7. A security device according to claim 6, wherein said conductive member includes a multi-sided block of nonconductive material provided with conductive material on two adjacent sides thereof.

8. A security device according to claim 7, wherein said first conductive path has a first terminal thereof connected to power supply means and to said first sensing means and a second terminal thereof connected through a first resistor to a reference potential and wherein said second conductive path has a first terminal thereof connected through a second resistor to said power supply means and to said second sensing means, and a second terminal thereof connected to said reference potential.

9. A security device according to claim 8, wherein said tamper detection circuitry includes temperature sensing means connected to said reset signal generating means and adapted, in response to a decrease in temperature within said housing below a predetermined temperature level, to provide a third control signal to cause said reset signal generating means to generate said reset signal.

10. A security device according to claim 9, wherein said memory means includes a resettable shift register adapted to be reset by said reset signal.

11. A security device for protecting stored sensitive data comprising:

a closed housing containing memory means adapted to store sensitive data;

a plurality of first and second substantially parallel conductive path means mounted in a winding configuration on the entire inner surface of said housing, said conductive path means being spaced from adjacent conductive path means by a distance of less than 26 micrometers thereby preventing the penetration of the housing without cracking the housing by the drilling of a small hole or the like in the housing which would not interrupt the conductive path means; and tamper detection circuitry including first and second sensing means connected respectively to said first and second conductive path means and to said memory means and responsive to an interruption of the respective first and second conductive path means to generate respective first and second control signals, said detection circuitry further including reset signal generating means connected to said first and second sensing means and being adapted in response to the generation of either of said first and second control signals to generate a reset signal to erase the contents of said memory means in the event of an interruption of said first and second conductive path means brought about by an attempt to penetrate said housing by the drilling of said small hole.

* * * * *

UNITED STATES PATENT AND TRADEMARK OFFICE
CERTIFICATE OF CORRECTION

PATENT NO. : 4,811,288

DATED : March 7, 1989

INVENTOR(S) : Theodoor A. Kleijne et al.

It is certified that error appears in the above-identified patent and that said Letters Patent is hereby corrected as shown below:

Column 12, line 57, before the word "interconnection", insert --said--.

Signed and Sealed this

Thirteenth Day of June, 1989

Attest:

DONALD J. QUIGG

Attesting Officer

Commissioner of Patents and Trademarks